United States Patent
Henrick et al.

(10) Patent No.: US 6,377,936 B1
(45) Date of Patent: *Apr. 23, 2002

(54) METHOD FOR PERFORMING TARGETED MARKETING OVER A LARGE COMPUTER NETWORK

(75) Inventors: Robert F. Henrick, Basking Ridge; Ajay Jain, Holmdel, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/492,170

(22) Filed: Jan. 27, 2000

Related U.S. Application Data

(63) Continuation of application No. 08/957,469, filed on Oct. 24, 1997.

(51) Int. Cl.$^7$ ............................................... G06F 17/60
(52) U.S. Cl. ........................................ 705/14; 709/206
(58) Field of Search ................................ 705/1, 14, 26, 705/29, 34; 709/218, 235, 206

(56) References Cited

U.S. PATENT DOCUMENTS

| | | | |
|---|---|---|---|
| 5,710,884 A | | 1/1998 | Dedrick |
| 5,724,521 A | | 3/1998 | Dedrick |
| 5,768,521 A | | 6/1998 | Dedrick |
| 5,793,972 A | * | 8/1998 | Shane ......................... 705/14 |
| 5,809,242 A | * | 9/1998 | Shaw et al. ................. 709/217 |
| 6,167,435 A | * | 12/2000 | Druckenmiller et al. .... 709/206 |
| 6,205,432 B1 | * | 3/2001 | Gabbard et al. .............. 705/14 |

FOREIGN PATENT DOCUMENTS

| | | | | |
|---|---|---|---|---|
| WO | WO 9722074 | * | 6/1997 | ................. 705/14 |

OTHER PUBLICATIONS

Marketers taking sides on how to use mass e–mail by Dana Blankenhorn, Business Marketing, May 1997.*

\* cited by examiner

*Primary Examiner*—Stephen Gravini
(74) *Attorney, Agent, or Firm*—Kenyon & Kenyon

(57) ABSTRACT

A method for enabling targeted marketing of users on the Internet maintains the privacy of the users. The present invention takes advantage of the unique customer knowledge of an Internet Service Provider (ISP) with respect to both the customers identity and their likes and dislikes, while preserving the privacy of those customers. Data mining is performed on customers, including the sites that they visit. For example, customers with children are identified by visits to the Disney site. The availability of this list is then used to attract businesses with interest in this customer base. An offer, perhaps with enticements such as coupons or contests, is prepared on a Web site. The ISP then makes the customer aware of that offer via an E-mail with short text describing that offer and a Hypertext link to that page. The customer is informed that they may take advantage of the offer and as a convenience and service to the customer and the advertiser, the ISP will provide their identity to the advertiser. Only when the customer selects the embedded URL is their identity disclosed. The ISP will then identify the customer to the advertiser by associating the customer's temporary IP address with their true identity as a service to the advertiser. Billing will be determined by both the total number of E-mails delivered and the number of responses generated.

23 Claims, 1 Drawing Sheet

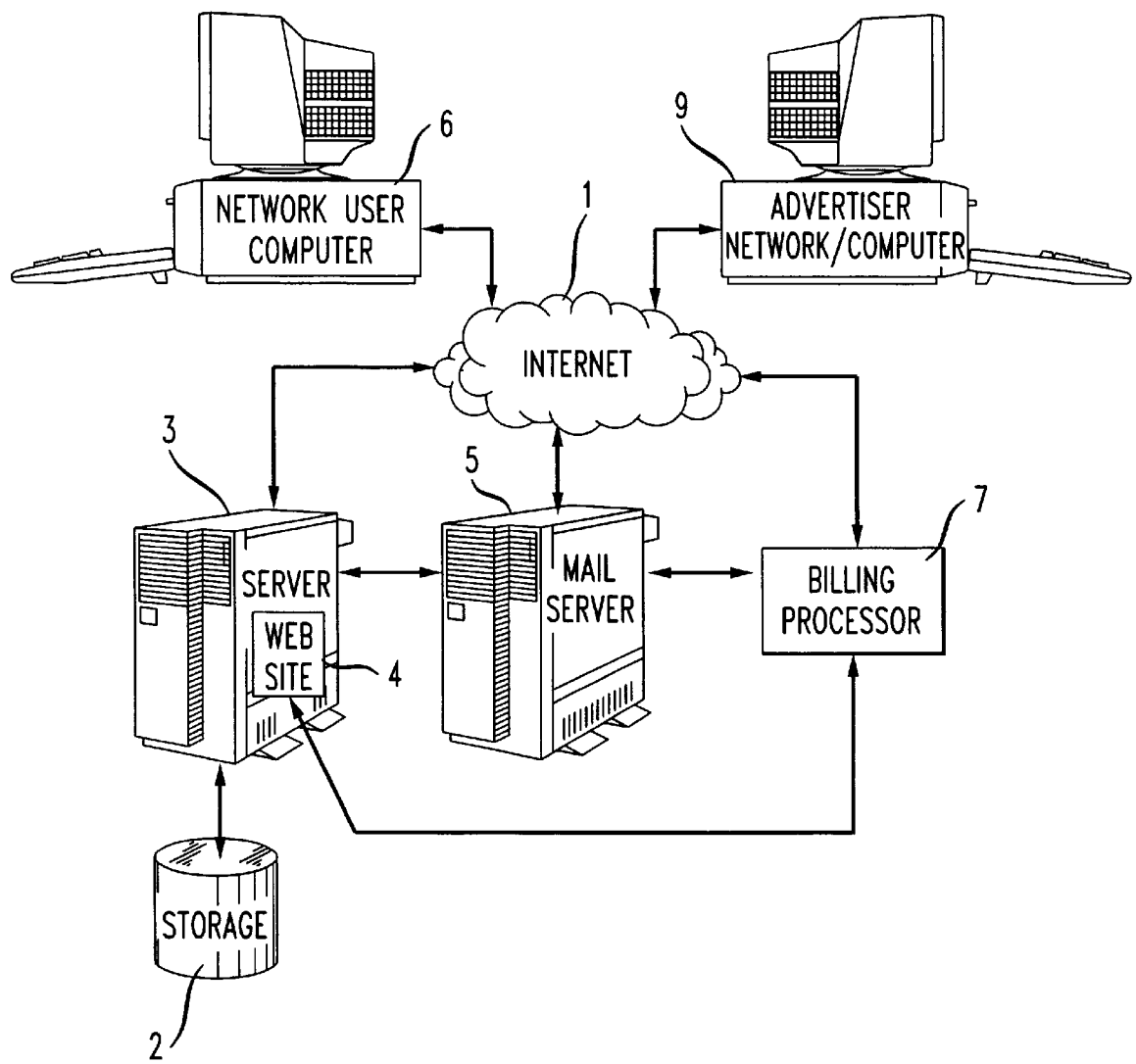

METHOD FOR PERFORMING TARGETED MARKETING OVER A LARGE COMPUTER NETWORK

CROSS REFERENCE TO RELATED APPLICATIONS

This application is a continuation of application 08/957,469, filed Oct. 24, 1997.

BACKGROUND OF THE INVENTION

The present invention relates generally to methods for operating computer networks, and more particularly to a method for operating a network of computers, such as the Internet, that enables businesses to perform targeted marketing to individuals who access the network.

Targeted marketing of individual users on the Internet is not a new concept. Many companies attempt to obtain information about users and the user's E-mail address so that they can identify particular users with potential interest in their products and services, and then direct market those particular users with an E-mail campaign at some date in the future. Unfortunately, even some users who might be interested in receiving information about a particular company are reluctant to provide any information to businesses over the Internet because they cannot be sure the information will not be accessible to third parties. Problems of fraud have become prevalent where users' identities were "stolen" by unscrupulous Internet users. Consequently, many users are reluctant to provide information about themselves to anyone over the Internet.

The present invention is therefore directed to the problem of developing a method for operating a computer network that enables merchandise and service providers to market their products to network users without invading the privacy of the user.

SUMMARY OF THE INVENTION

The present invention solves this problem by creating a customer list that includes a plurality of network users having a common interest, sending an E-mail to the plurality of network users describing an advertisement by a particular advertiser, wherein the E-mail includes a hypertext link with an embedded URL to a web site of the particular advertiser, and then disclosing, only when a particular network user selects the embedded URL, the network user's identity to the particular advertiser by associating a temporary IP address for the particular network user with an actual identity of the particular network user. In this case, the particular advertiser is only billed based on a total number of E-mails delivered and a total number of responses generated.

To obtain the customer list, the present invention performs data mining on another plurality of network users, including obtaining information regarding which sites said another plurality of network users visit to obtain the customer list.

According to an advantageous implementation of the method of the present invention, a message delivery time stamp is captured for each message delivered to each of the plurality of network users.

According to another advantageous implementation of the method of the present invention, a user is identified with a temporary IP address through an Active User Registry (AUR).

According to yet another advantageous implementation of the method of the present invention, a report is generated and sent to the particular advertiser on an agreed time interval for a contracted duration on those users who have accessed the web site along with all requested information relating to E-mail messages delivered and a number of responses generated.

According to another advantageous implementation of the method of the present invention, a consent agreement to allow the user's identity to be passed to the particular advertiser is embedded in the E-mail message when it is delivered.

According to the present invention, an apparatus for performing targeted marketing over a computer network, includes a server coupled to the computer network, a mail server, and a billing processor. The server creates a customer list that includes a plurality of network users having a common interest. The mail server is coupled to the server and sends an E-mail to the plurality of network users describing an advertisement by a particular advertiser, wherein the E-mail includes a hypertext link with an embedded URL to a web site of the particular advertiser the server discloses, only when a particular network user selects the embedded URL, the network user's identity to the particular advertiser by associating a temporary IP address for the particular network user with an actual identity of the particular network user. The billing processor prepares a bill for the particular advertiser based on a total number of E-mails delivered and a total number of responses generated.

Another embodiment of an apparatus for performing targeted marketing over a computer network, includes a server, a mail server, means for disclosing, means for transmitting, means for preparing and transmitting a bill, means for performing data mining, and means for certifying. The server is coupled to the computer network, and includes means for creating a customer list that includes a plurality of network users having a common interest, report generating means, storage, a web site for a particular advertiser tailored to the common interest of the plurality of network users, and means for identifying a user with a temporary IP address through an Active User Registry (AUR). The mail server is coupled to the server and sends an E-mail to the plurality of network users describing an advertisement by a particular advertiser, wherein the E-mail includes a hypertext link with an embedded URL to the web site of the particular advertiser. The mail server includes means for associating a table with each message to capture a message delivery time stamp, and means for embedding a consent agreement to allow the user's identity to be passed to the particular advertiser in the E-mail message when it is delivered. The means for disclosing, only discloses a particular network user's identity to the particular advertiser when the particular network user selects the embedded URL. To do so, the means for disclosing associates a temporary IP address for the particular network user with an actual identity of the particular network user. The report generating means generates a report of all those users who respond to the E-mail. The means for transmitting transmits the report electronically to the particular advertiser on an agreed time interval for a contracted duration on those users who have accessed the web site along with all requested information relating to E-mail messages delivered and a number of responses generated. The storage stores all information received from those users who access the web site. The means for preparing and transmitting a bill prepares and transmits the bill for the particular advertiser based on a total number of E-mails delivered and a total number of responses generated. The means for performing data mining does so on another plurality of network users, including obtaining information regarding which sites said another plurality of network users visit to obtain the customer list. The means for certifying certifies delivery of the E-mail across all carriers.

BRIEF DESCRIPTION OF THE DRAWINGS

The sole FIGURE depicts an embodiment of the present invention.

DETAILED DESCRIPTION

The present invention takes advantage of the unique customer knowledge of an Internet Service Provider (ISP) with respect to both the customers identity and their likes and dislikes, while preserving the privacy of those customers. Data mining is performed on customers, including the sites that they visit. For example, customers with children are identified by visits to the Disney site. The availability of the customer list is then used to attract businesses with interest in this customer base.

An offer, perhaps with enticements such as coupons or contests, is prepared on a Web site by the particular business with interest in these customers. The ISP then makes the customer aware of that offer (or website) via an E-mail with short text describing the offer and a Hypertext link to that web page.

The customer is informed that they may take advantage of the offer and as a convenience and service to the customer and the advertiser, the ISP will provide their identity to the advertiser. Only when the customer selects the embedded URL is their identity disclosed to the advertiser. Because the ISP has direct links to the customer and the advertiser, the ISP can provide this information to the advertiser without making it available to the public at large. In addition, the ISP can certify to the users that the advertisers are legitimate. This can involve requiring the advertiser to agree not to resell the customer database.

The ISP will then identify the customer to the advertiser by associating the customer's temporary IP address with their true identity as a service to the advertiser. Billing for this service will be determined by both the total number of E-mails delivered and the number of responses generated.

To accomplish the above functions, the Web Site must include at least the following capabilities for each message:

(1) A table associated with each message to capture the message delivery time stamp.

(2) The ability to identify a user with a temporary IP address through an Active User Registry (AUR).

(3) A report generating tool to generate a report of all the people who responded to the message.

(4) Storage capacity for the material during the advertising campaign.

The simplified call/message flow occurs as follows:

1. The ISP mails an E-mail message to the customers in the customer mailing list generated from the data mining along with a hyper-link to the Web site for access the Web site and viewing the contents.

2. A table entry is made of all the recipients of the message on the Web server.

3. When the receiver logs on his/her mail server, only the brief description along with the hyper-link information in the content is delivered.

4. If recipient decides to access the site, then the site will have available to the advertiser the AUR mapping of the temporary IP address to the actual customer.

5. A report is then generated and sent to the advertiser at an agreed time interval for the contracted duration listing the people who have accessed the Web site along with all the requested information relating to customer messages delivered and number of hits.

This service will be for the sending party and the sending party will pay for delivery of the message delivery. However, the receiving party will maintain control of who gets the information. To avoid the privacy issue the recipient's information will be disclosed by having consent from the recipient. The consent agreement will be embedded in the message when it is delivered.

In key differences relative to the current practice of targeted advertising include the introduction of a new paradigm—recipients access the Web site at their convenience, however they are notified about the availability of the information in a timely manner. In addition, the recipient of the offer makes a conscious and informed decision to provide his/her identity in exchange for advertisers offer. Moreover, the ISP guarantees the validity of the recipients information (i.e., the recipient cannot enter a bogus identity). Also, the present invention introduces hyper-links in the message content to link with actual Web-site. The present invention enables multimedia, video, and high bandwidth user messaging without bogging down the network by using asynchronous delivery of the content (i.e., only a small fraction of consumers will require the bandwidth). The present invention certifies delivery of the messages across all the carriers. The present invention also introduces market intelligence delivery to the target direct marketer. The present invention collects the recipients' message content pickup time, granularity of the content read etc. Collectively, this set of enhancements enables customized targeted direct marketing for a segment of customers, while providing assurances of privacy to the customers.

Referring to FIG. 1, a server 3 is shown coupled to the Internet 1, along with a mail server 5, a billing processor 7 and an advertiser computer 9. Each of these servers and computers can be standard computers programmed to interact with the Internet 1 in a known manner.

The server 3 includes storage for storing information regarding users, which information is obtained from the users when they access the web site 4. The web site 4 has been tailored to the common interest of the users identified by the ISP. The mail server 5 transmits the E-mail to the user 6 over the Internet in a known manner. The billing processor 7 prepares a bill for the particular advertiser based on a total number of E-mails delivered and a total number of responses generated, and transmits the bill to the particular advertiser over the Internet 1 in an E-mail message or other manner known to those of skill in the art.

The server 3 includes software routines for performing the following tasks:

(1) creating a customer list that includes users having a common interest based on identifying those users who access a particular web site;

(2) generating a report of all those users who respond to an E-mail message regarding an advertiser's offer and web site location; and (3) identifying a user with a temporary IP address through an Active User Registry (AUR).

The mail server includes software routines for performing the following tasks:

(1) sending an E-mail to the plurality of network users describing an advertisement by a particular advertiser, wherein the E-mail includes a hypertext link with an embedded URL to the web site of the particular advertiser;

(2) associating a table with each E-mail message to capture a message delivery time stamp; and (3) embedding a consent agreement to allow the user's identity to be passed to the particular advertiser in the E-mail message when it is delivered.

The server also includes a routine for disclosing, only when a particular network user selects the embedded URL, the network user's identity to the particular advertiser. This routine associates a temporary IP address for the particular network user with an actual identity of the particular network user.

The server also includes a routine for transmitting the report electronically to the particular advertiser on an agreed time interval for a contracted duration on those users who have accessed the web site along with all requested information relating to E-mail messages delivered and a number of responses generated.

In addition, the server includes a routine for preparing and transmitting a bill for the particular advertiser based on a total number of E-mails delivered and a total number of responses generated.

The server also includes a routine for performing data mining on another plurality of network users, including obtaining information regarding which sites said another plurality of network users visit to obtain the customer list.

Finally, the mail server includes a routine for certifying delivery of the E-mail across all carriers.

What is claimed is:

1. A method for performing targeted marketing over a computer network, comprising:
   a) compiling customer list information that includes user identity information for a plurality of network users having a common interest;
   b) sending an E-mail to the plurality of network users by using said customer list information, the E-mail describing an advertisement by a particular advertiser, wherein the E-mail includes a hypertext link with an embedded URL to a web site of the particular advertiser; and
   c) disclosing, only when a particular network user selects the embedded URL, the network user's identity from said customer list information to the particular advertiser.

2. The method according to claim 1, further comprising performing data mining on another plurality of network users, including obtaining information regarding which sites said another plurality of network users visit to supplement the customer list information.

3. The method according to claim 1, further comprising creating a web site tailored to the common interest of the plurality of network users.

4. The method according to claim 1, further comprising capturing a message delivery time stamp for each E-mail message delivered to each of the plurality of network users.

5. The method according to claim 1, wherein disclosing the network user's identity from said customer list information to the particular advertiser comprises associating a temporary IP address for the particular network user with an actual identity of the particular network user.

6. The method according to claim 5, further comprising identifying a user with a temporary IP address through an Active User Registry (AUR) and associating said user's identity from said customer list information with said temporary IP address.

7. The method according to claim 1, further comprising making a table entry of all the recipients of the E-mail.

8. The method according to claim 1, further comprising generating a report and sending the report to the particular advertiser on an agreed time interval for a contracted duration on those users who have accessed the web site along with all requested information relating to E-mail messages delivered and a number of responses generated.

9. The method according to claim 1, further comprising embedding, in the E-mail, a consent agreement to allow the user's identity to be passed to the particular advertiser.

10. The method according to claim 1, wherein the E-mail in step b) includes one or more of the following: video, graphics, multimedia, audio, files, and text.

11. The method according to claim 1, further comprising certifying delivery of the E-mail across all carriers.

12. The method according to claim 1, further comprising billing the particular advertiser based on the E-mails delivered and the responses generated.

13. An apparatus for performing targeted marketing over a computer network, comprising:
   a) a server coupled to the computer network, said server compiling customer list information that includes user identification information for a plurality of network users having a common interest; and
   b) a mail server coupled to the server sending an E-mail to the plurality of network users by using the compiled customer list information, the E-mail describing an advertisement by a particular advertiser, wherein the E-mail includes a hypertext link with an embedded URL to a web site of the particular advertiser, wherein the server discloses, only when a particular network user selects the embedded URL, the network user's identity from the customer list information to the particular advertiser.

14. The apparatus according to claim 13, wherein the server performs data mining on another plurality of network users, including obtaining information regarding which sites said another plurality of network users visit to supplement the customer list information.

15. The apparatus according to claim 13, further comprising a web site on the server tailored to the common interest of the plurality of network users.

16. The apparatus according to claim 13, wherein the mail server wherein the mail server captures a message delivery time stamp for each E-mail delivered to each of the plurality of network users.

17. The apparatus according to claim 13, wherein the server discloses the network user's identity from the customer list information to the particular advertiser by associating a temporary IP address for the particular network user with an actual identity of the particular network user.

18. The apparatus according to claim 17, wherein the server identifies a user with a temporary IP address through an Active User Registry (AUR).

19. The apparatus according to claim 13, wherein the server includes storage for all information received from those users who access the web site.

20. The apparatus according to claim 13, wherein the server generates a report and sends the report electronically to the particular advertiser on an agreed time interval for a contracted duration on those users who have accessed the web site along with all requested information relating to E-mail messages delivered and a number of responses generated.

21. The apparatus according to claim 13, wherein the mail server embeds, with the E-mail, a consent agreement to allow the user's identity to be passed to the particular advertiser.

22. The apparatus according to claim 13, wherein the mail server certifies delivery of the E-mail across all carriers.

23. The apparatus according to claim 13, further comprising a billing processor that prepares a bill for the particular advertiser based on the E-mails delivered and the responses generated.

* * * * *